US010704447B2

(12) United States Patent
Andersson et al.

(10) Patent No.: US 10,704,447 B2
(45) Date of Patent: Jul. 7, 2020

(54) INTERNAL COMBUSTION ENGINE SYSTEM (71) Applicant: VOLVO TRUCK CORPORATION, Göteborg (SE)

(72) Inventors: Lennart Andersson, Varberg (SE); Arne Andersson, Mölnlycke (SE); Bengt Johansson, Lund (SE); Nhut Lam, Bjuv (SE); Staffan Lundgren, Hindås (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 179 days.

(21) Appl. No.: 16/060,967

(22) PCT Filed: Dec. 14, 2015

(86) PCT No.: PCT/EP2015/079581
§ 371 (c)(1),
(2) Date: Jun. 11, 2018

(87) PCT Pub. No.: WO2017/101966
PCT Pub. Date: Jun. 22, 2017

(65) Prior Publication Data
US 2018/0363535 A1 Dec. 20, 2018

(51) Int. Cl.
*F01N 13/00* (2010.01)
*F01N 3/20* (2006.01)
(Continued)

(52) U.S. Cl.
CPC ......... *F01N 13/0097* (2014.06); *F01N 3/021* (2013.01); *F01N 3/035* (2013.01);
(Continued)

(58) Field of Classification Search
CPC ...... F02M 31/042; F02M 31/06; F02M 31/08; F02M 31/0825; F02M 31/087;
(Continued)

(56) References Cited

U.S. PATENT DOCUMENTS 2,404,395 A * 7/1946 Milliken ................... F02G 3/02
60/39.511
3,808,818 A * 5/1974 Cataldo ................... F02B 75/02
60/620
(Continued)

FOREIGN PATENT DOCUMENTS

CN 101405484 A 4/2009
CN 101809260 A 8/2010
(Continued)

OTHER PUBLICATIONS

International Search Report (dated Nov. 14, 2016) for corresponding Internattonal App. PCT/EP2015/079581.
(Continued)

*Primary Examiner* — Laert Dounis
(74) *Attorney, Agent, or Firm* — Venable LLP; Jeffri A. Kaminski (57) ABSTRACT

An internal combustion engine system includes at least one combustor, a compressor arranged to compress air, an air guide arranged to guide compressed air from the compressor to at least one of the at least one combustor, an expander arranged to expand exhaust gases from at least one of the at least one combustor and to extract energy from the expanded exhaust gases, and an exhaust guide arranged to guide exhaust gases from at least one of the at least one combustor to the expander, wherein the exhaust guide is at least partly integrated with the air guide.

31 Claims, 9 Drawing Sheets

(51) Int. Cl.

| | |
|---|---|
| *F02M 35/10* | (2006.01) |
| *F01N 13/14* | (2010.01) |
| *F02G 1/02* | (2006.01) |
| *F02G 3/02* | (2006.01) |
| *F02B 33/20* | (2006.01) |
| *F02B 33/44* | (2006.01) |
| *F02B 37/10* | (2006.01) |
| *F02B 41/06* | (2006.01) |
| *F02M 31/04* | (2006.01) |
| *F01N 3/035* | (2006.01) |
| *F02M 31/093* | (2006.01) |
| *F01N 3/021* | (2006.01) |
| *F01N 13/10* | (2010.01) |

(52) U.S. Cl.
CPC ......... *F01N 3/2066* (2013.01); *F01N 13/102* (2013.01); *F01N 13/141* (2013.01); *F01N 13/145* (2013.01); *F02B 33/20* (2013.01); *F02B 33/443* (2013.01); *F02B 37/105* (2013.01); *F02B 41/06* (2013.01); *F02G 1/02* (2013.01); *F02G 3/02* (2013.01); *F02M 31/042* (2013.01); *F02M 31/093* (2013.01); *F02M 35/10157* (2013.01); *F02M 35/10268* (2013.01); *F02M 35/10288* (2013.01); *F01N 2240/02* (2013.01); *Y02A 50/2325* (2018.01); *Y02T 10/126* (2013.01); *Y02T 10/144* (2013.01); *Y02T 10/24* (2013.01)

(58) Field of Classification Search
CPC ............ F02M 31/093; F02M 35/10288; F01N 13/0097; F01N 13/102; F01N 13/141–148; F02B 33/20; F02B 33/443
See application file for complete search history.

(56) References Cited

U.S. PATENT DOCUMENTS

| | | | | |
|---|---|---|---|---|
| 3,916,858 A * | 11/1975 | Taguchi | ............. | F02B 19/1028 123/274 |
| 4,133,172 A * | 1/1979 | Cataldo | .................... | F02G 1/02 123/294 |
| 4,476,821 A * | 10/1984 | Robinson | .............. | F02B 33/443 123/275 |
| 4,653,269 A * | 3/1987 | Johnson | .................... | F02G 1/00 60/39.63 |
| 4,783,966 A | 11/1988 | Aldrich | | |
| 5,079,911 A * | 1/1992 | Kumakura | ................ | F02C 7/08 60/39.511 |
| 5,857,436 A * | 1/1999 | Chen | ....................... | F02B 33/22 123/68 |
| 6,178,744 B1 | 1/2001 | Perset | | |
| 6,564,545 B1 | 5/2003 | Dong | | |
| 7,607,301 B2 * | 10/2009 | Harada | ............... | F02B 29/0406 123/568.12 |
| 8,858,223 B1 * | 10/2014 | Proeschel | ........... | F02M 31/042 431/11 |
| 2006/0093977 A1 * | 5/2006 | Pellizzari | ................ | F02G 1/055 431/215 |
| 2011/0303185 A1 | 12/2011 | Zajac et al. | | |
| 2012/0260627 A1 | 10/2012 | Durrett et al. | | |
| 2018/0016997 A1 * | 1/2018 | Snyder | ...................... | F01N 5/04 |
| 2018/0363526 A1 * | 12/2018 | Andersson | ........... | F01N 3/2066 |

FOREIGN PATENT DOCUMENTS

| | | | | |
|---|---|---|---|---|
| CN | 102165158 A | | 8/2011 | |
| DE | 2733315 A1 * | | 2/1979 | .............. F02B 33/06 |
| DE | 102010047112 A1 * | | 9/2011 | .............. F02G 3/02 |
| GB | 2294501 A | | 5/1996 | |
| JP | S5732007 A | | 2/1982 | |
| JP | 4010807 B2 | | 7/2003 | |
| WO | 0006876 A1 | | 2/2000 | |
| WO | 0175290 A1 | | 10/2001 | |
| WO | 2012021102 A1 | | 2/2012 | |
| WO | 2015085935 A1 | | 6/2015 | |

OTHER PUBLICATIONS

China Office Action dated Apr. 26, 2020 in corresponding Chinese Application No. 20158008530.1, 16 pages.

* cited by examiner

INTERNAL COMBUSTION ENGINE SYSTEM

BACKGROUND AND SUMMARY

The invention relates to an internal combustion engine system comprising a combustor, a compressor arranged to compress air, an air guide arranged to guide compressed air from the compressor to the combustor, an expander arranged to expand exhaust gases from the combustor and to extract energy from the expanded exhaust vases, and an exhaust guide arranged to guide exhaust vases from the combustor to the expander. The invention also relates to an exhaust guiding unit an exhaust treatment unit and a vehicle.

The invention can be applied in heavy-duty vehicles, such as trucks, buses and construction equipment, e.g. working machines. The invention can also be applied to cars. Although the invention will be described with respect to a truck, the invention is not restricted to this particular vehicle type.

It is known that internal combustion engines with multiple stages of compression and expansion may provide for reaching very high pressures and for extracting more energy from the fuel, U.S. Pat. No. 4,783,966A provides an example of such an engine. Such engines require however relatively large amounts of space, and may add weight to a vehicle in which they are provided.

It is desirable to reduce, tier vehicle propulsion applications, the space requirement and/or the weight of a multiple stage compression and expansion internal combustion engine.

According to an aspect of the invention, an internal combustion engine system comprising an internal combustion engine system is provided comprising at least one combustor, a compressor arranged to compress air, an air guide arranged to guide compressed air from the compressor to at least one of the at least one combustor, an expander arranged to expand exhaust gases from at least one of the at least one combustor and to extract energy from the expanded exhaust gases, and an exhaust guide arranged to guide exhaust gases from at least one of the at least one combustor to the expander, characterized in that the exhaust guide is at least partly integrated with the air guide.

It is understood that depending on the type of fuel system used for the engine, the compressor may be arranged to compress air only, or a premix of air and fuel.

Integrating the exhaust guide with the air guide provides for a combination of two parts which during engine operation present elevated pressures and temperatures. This in turn makes it possible to allow these guides to share loads generated by the operational conditions, so that the amount of material for these parts may be reduced. Hence weight may be saved. Also, the integration of the guides allows for a reduction of the space consumed by the engine. Therefore, both weight and space savings are provided, which is advantageous where the engine system is used in a vehicle.

The invention could be said to allow all of, or parts of the exhaust guide to be isolated by the air guide. This reduces the temperature of the wall material of the exhaust guide, which makes it possible to use less temperature resistant, and therefore cheaper material for the exhaust guide. Also, the isolation of the exhaust guide by the air guide provides for reducing the heat radiation around the exhaust guide, without the need to provide isolation material around the exhaust guide. This is a substantial advantage in vehicles, where space requirements are strict. The possibility to reduce or omit isolation material for the exhaust guide reduces the volume of the engine system, as well as the cost therefore.

In addition, the integration of the exhaust guide with the air guide allows the gas conducting volumes in the guides to share one or more walls. This in turn reduces energy losses of the gases when transported between the compressor(s), combustor(s) and expander(s).

In addition, the integration of the exhaust guide with the air guide allows for a movement of the compressed air in the air guide past the exhaust guide, providing an exchange of heat from the exhaust guide to the air. This heat exchange is augmented by the elevated absolute pressure in the air guide. The heat exchange provides for reusing the heat for power production, which may be of particular interest at a low load operation of the engine.

Thus, the invention provides an engine with multiple stages of compression and expansion with reduced weight and space requirements, and with reduced losses or improved efficiency.

Preferably, the exhaust guide comprises an integrated portion which is located within the air guide. Thereby, the exhaust guide is suitably arranged to penetrate an external wall of the air guide. The integrated portion of the exhaust guide being located within the air guide provides an advantageous manner of reducing the volume required for the engine system, e.g. in a vehicle. Also, material, and hence weight, can be reduced since the pressure difference across a wall of the integrated portion is reduced, thereby reducing the structural load and allowing less material to be used for the integrated portion. Also, the location inside the air guide provides a particularly advantageous way for the exhaust guide to transfer heat to the air in the air guide. In addition, the amount of insulation material surrounding parts of the engine system may be reduced since the air guide will provide insulation for the integrated portion.

Preferably, the integrated portion presents a wall delimiting the integrated portion, and that the integrated portion comprises an insulation layer located inside the wall. Thereby, the temperature in the material of said wall may be limited, so as to avoid a strength reduction in the material. This in turn allows less material to be used for said wall. Preferably, the integrated portion presents a circular cross section, which will further increase the structural integrity of the integrated portion, thereby allowing less material to be used for it.

The integrated portion may present a plurality of externally protruding flanges. Thereby, the beneficial exchange of heat to the compressed air moving past the integrated portion may be augmented.

Preferably, the air guide comprises an air buffer container arranged to provide an at buffer volume for the compressed air. Where the system comprises a plurality of combustors, the air buffer container may be arrange d to deliver the compressed air to a plurality of the combustors. Where the system comprises a plurality of compressors, the air buffer container may be arranged to receive compressed air from a plurality of the compressors. In alternative embodiments, there may be one or more air buffer containers, each dedicated for a single respective compressor and/or combustor.

The air buffer container reduces or eliminates a requirement in a multiple stage compression engine that the timing of inlet and outlet valves, for admission and ejection of air at the combustors and the compressors, must be highly correlated to avoid losses with pulsating flows. Thanks to the air buffer volume, this requirement of correlation of such valve timing may be relaxed without increasing the risk of pulsating flows. Thereby simpler and cheaper valve control systems may be employed, It is understood that the air buffer volume of the air buffer container suitably presents a cross-section which is larger than any lateral cross-section, perpendicular to a local intended air flow direction, of air guide portions upstream and downstream of the air buffer volume.

Preferably, said at least part of the exhaust guide is located, within the air buffer container. Thereby, an advantageous use of a part of the air buffer volume for the integration of the at least part of the exhaust guide is provided, further augmenting the space saving benefits of the invention.

Preferably, the exhaust guide comprises an exhaust buffer container. Where the system comprises a plurality of combustors, the exhaust buffer container may be arranged to receive exhaust gases from a plurality of the combustors. Where the system comprises a plurality of expanders, the exhaust buffer container may be arranged to deliver exhaust gases to a plurality of the expanders. In alternative embodiments, there may be one or more exhaust buffer containers, each dedicated for a single respective combustor and/or expander.

The exhaust buffer container reduces or eliminates the risk of pulsating flows in the exhaust guide. Thereby simpler and cheaper valve control systems may be employed.

It is understood that the exhaust buffer container suitably presents a cross-section which is larger than any lateral cross-section, perpendicular to a local intended exhaust flow direction, of exhaust guide portions upstream and downstream of the exhaust buffer volume.

Preferably, the exhaust buffer container is located within the air guide. Advantageously, where the air guide presents and air buffer container as described above, the exhaust buffer container is located within the air buffer container. Thereby said risk of pulsating flows may be reduced or eliminated, while at the same time reducing the space requirements of presented by the exhaust buffer container and the air buffer container.

Preferably, a pre-expander exhaust treatment device is located in the exhaust guide, which pre-expander exhaust treatment device is arranged to provide an exhaust treatment process to the exhaust gases from the combustor. Thereby, the relatively high pressure and temperature between the combustor and expander may be advantageously utilised to support the processes in the exhaust treatment device. It should be noted however, that instead of housing an exhaust treatment device, the exhaust guide exhaust buffer container may be a pure buffer tank.

Preferably, where the exhaust guide comprises an integrated portion which is located within the air guide, the pre-expander exhaust treatment device is located in the integrated portion. Thereby, part of the heat generated by the processes in the exhaust treatment device may be advantageously transferred to the air in the air guide, with benefits as described above.

Preferably, the pre-expander exhaust treatment device comprises an oxidation catalyst, and/or a particulate filter. Where a particulate filter is provided in addition to an oxidation catalyst, the particulate filter may be located downstream of the oxidation catalyst. Thereby, the temperature increasing process of the oxidation catalyst may be used for advantageously elevating the heat in the particulate filter, increasing the efficiency of the latter. Also, particularly in diesel and high pressure gas injection (HPGI) engines, the risk of soot and catalyst coatings reaching the expander will be substantially reduced with said spatial arrangement of the oxidation catalyst and the particulate filter.

In some embodiments, the system comprises a post-expander exhaust treatment device arranged to receive exhaust gases from the expander and to provide an exhaust treatment process to the received exhaust gases. The post-expander exhaust treatment device may be a selective catalytic reduction (SCR) catalyst. This provides for a nitrogen oxide (NOx) reduction of the multi-stage expansion engine.

Preferably, the post-expander exhaust treatment device and the air guide are integrated with each other. Thereby the post-expander exhaust treatment device may be located within the air guide. Thereby, an advantageous heat exchange may be provided between the compressed air and the post-expander exhaust treatment device.

Preferably, where the exhaust guide comprises an integrated portion which is located within the air guide, the post-expander exhaust treatment device is located externally of the integrated portion and internally of an external wall of the air guide. Preferably, a pre-expander exhaust treatment device is located in the integrated portion, which pre-expander exhaust treatment device is arranged to provide an exhaust treatment process to the exhaust gases from the combustor. Thereby, and integration of the pre-expander exhaust treatment device and the post-expander exhaust treatment device may be provided, which may allow an advantageous heat transfer from the pre-expander exhaust treatment device to the post-expander exhaust treatment device. This is particularly advantageous, since the first expander extracts energy, i.e. heat from the exhaust gases, and by the heat transfer from the pre-expander exhaust treatment device, the temperature in the post-expander exhaust treatment device may be kept high enough for the process therein. Further, the post-expander exhaust treatment device may provide an insulation of the pre-expander exhaust treatment device Said expander may be a first expander, wherein the system also comprises a second expander arranged to receive and expand exhaust gases from the post-expander exhaust treatment device and to extract energy from the expanded exhaust gases. The second expander may extract energy provided by the heat production of the process in the post-expander exhaust treatment device. The second expander may be a piston expander arrange to drive a crankshaft of the engine system with the extracted energy.

The system is, preferably arranged so that during an operation thereof, the post-expander exhaust treatment device presents a pressure within the range of 4-8 bar, and a temperature within the range of 250-400° C. Thereby, advantageous conditions are provided for the processes in the post-expander exhaust treatment device. However, in some embodiments, the post-expander exhaust treatment device may be located in a tailpipe of a vehicle in which the engine system is provided. Thereby, the post-expander exhaust treatment device may present during an operation of the engine system a pressure of around 1 bar, and a temperature within the range of 200-300° C.

Preferably, the system is arranged so that during an operation thereof, the exhaust guide presents a pressure within the range of 10-25 bar. Such a high pressure makes it possible to provide the exhaust guide with an oxidation catalyst and/or a particulate filter presenting small volumes, which is favourable for limiting the overall size of the engine system. Also, the high absolute pressure provides for a very small pressure drop over the pre-expander exhaust treatment device. The combination of the location of the pre-expander exhaust treatment device and said temperature and pressure ranges provides for a very small decrease in engine efficiency compared to traditional exhaust after treatment systems in vehicle tail pipes.

Preferably, the system is arranged so that during an operation thereof, the exhaust guide presents a temperature within the range of 300-950° C., preferably 500-900° C. It is understood that the temperature within such a range may vary depending on the operational situation of the engine system. It should be noted that such a temperature range provides very favourable conditions for a particulate titter in the exhaust guide for continuous oxidation of soot, so that the pre-expander exhaust treatment device may be provided without any catalyst. Said temperature range may also be beneficial for catalytic, methane oxidation, e.g. in a high pressure gas injection (HPGI) engine.

The system may arranged so that during an operation thereof, the air guide presents a pressure within the range of 8-12 bar, and/or a temperature within the range of 250-350° C. Thereby, a high power output of the engine, with an effective combustion may be provided.

The invention is particularly advantageous where the combustor comprises a piston arranged to reciprocate in a cylinder, and to drive a crankshaft of the system. It is understood that the system may comprise a plurality of combustors, each comprising a piston arranged to reciprocate in a respective cylinder, whereby the piston are all arranged to drive the crankshaft. The compressor is preferably a piston compressor, arranged to be driven by the crankshaft. The expander is preferably a piston expander arranged to drive the crankshaft with the extracted energy. Thus, the invention may be advantageously implemented in a multistage compression and expansion engine where the compressors) and the expander(s) are connected to the crankshaft. Such a connection may be direct or indirect, as exemplified below. Typically, the expander(s) may provide 30-50%, e.g. 40%, of the total power of the engine, and the compresser(s) may take 10-20% of the total power of the engine.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings.

DETAILED DESCRIPTION

Figure 1:
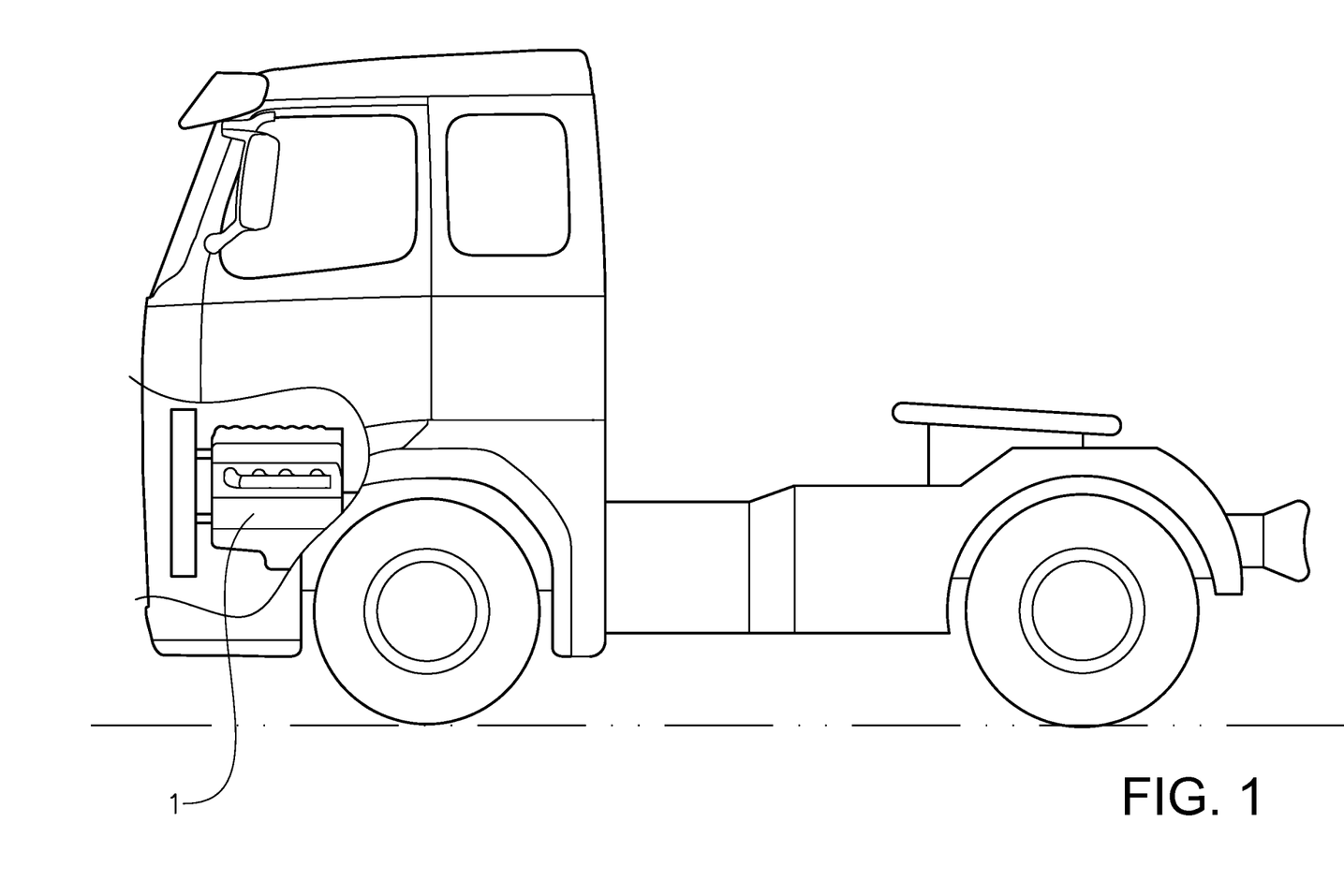
FIG. 1 is a partially sectioned side view of a vehicle in the form of a truck.

FIG. 1 shows a vehicle in the form of a truck, or a tractor for a semitrailer. It should be noted however that the invention is applicable to a variety of alternative types of vehicles, such as a car, a bus, or a working machine such as a wheel loader. The vehicle comprises an internal combustion engine system 1.

Figure 2:
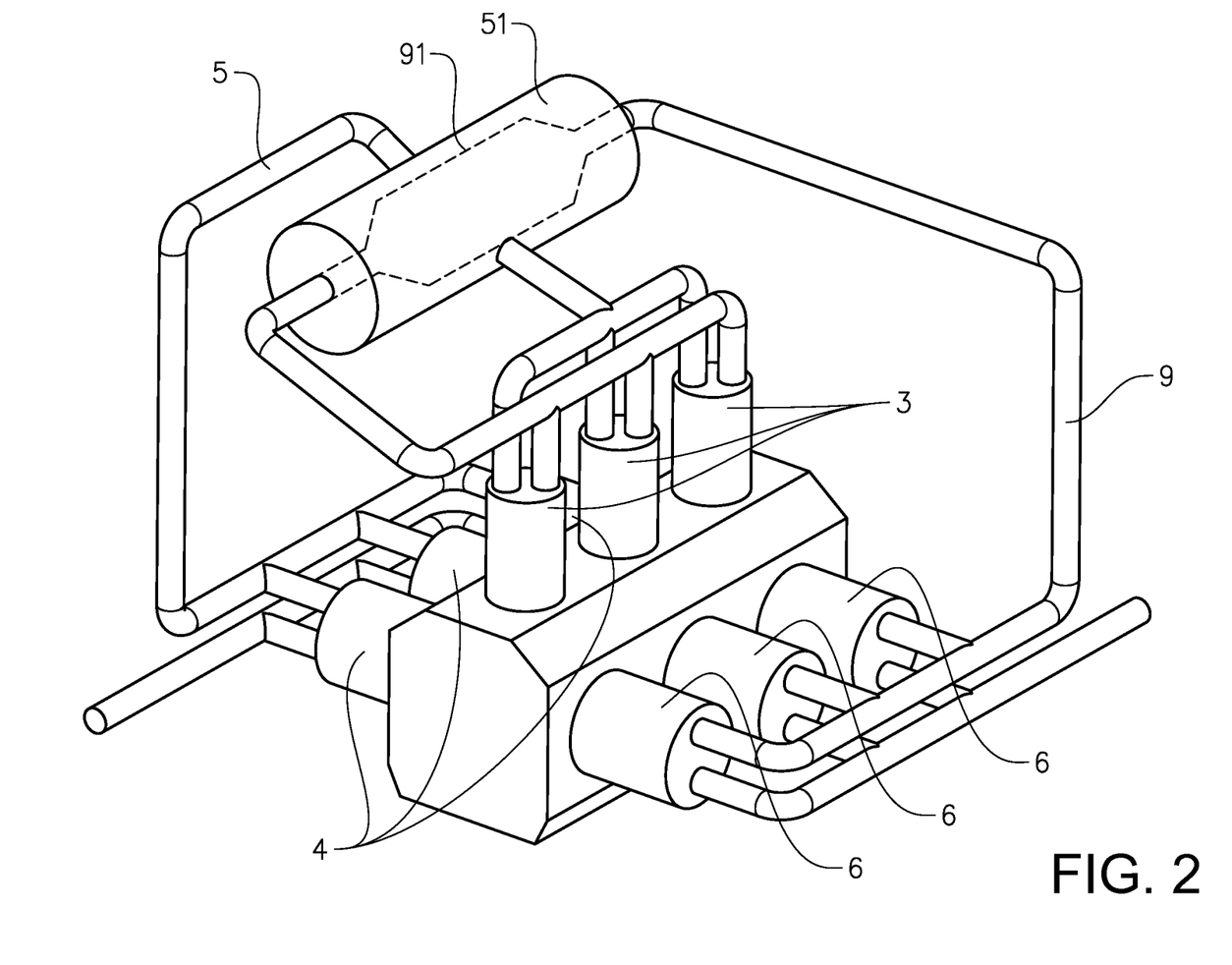
FIG. 2 is a schematic perspective view of an engine system in the vehicle in FIG. 1.

FIG. 2 is schematic and does not show, for simplicity of this presentation, certain parts such as devices for the actuation of inlet and outlet valves in cylinders of the engine system. The engine system 1 comprises a multi-stage compression and expansion internal combustion engine. The engine comprises three combustors 3, in the form of cylinders with pistons, and three piston compressors 4.

The system further comprises an air guide 5 arranged to guide compressed air from the compressors 4 to the combustors 3. The air guide is provided with an air buffer container 51, arranged to receive compressed air from the compressors 4, to provide an air buffer volume 511 for the compressed air, and to deliver the compressed air to the combustors 3.

The system farther comprises three piston expanders 6 arranged to expand exhaust gases from the combustors 3 and to extract energy from the expanded exhaust gases. An exhaust guide 9 is arranged to guide exhaust gases from the combustors 3 to the expanders 6. The exhaust guide 9 comprises an exhaust buffer container 91 described closer below.

It is understood that the engine system may comprise any number of combustors 3, compressors 4, and expanders 6. In this example, the combustors 3, compressors 4, and expanders 6 share a single air buffer 51 and a single exhaust buffer container 91. However, the number of air guides 5, air buffers 51, exhaust guides 9, and exhaust buffer containers 91 may vary as well. For example, it is conceivable that a plurality of air guides 5 with respective air buffers 51 extend between respective pairs of compressors 4 and combustors 3. Also, in some embodiments, there may be more than one exhaust guide 9 with respective exhaust buffer containers 91 extending between respective pairs of combustors 3 and expanders 6. In is also conceivable that there are two or more air guides, and two or more exhaust guides, connected to respective groups of combustors.

Figure 3:
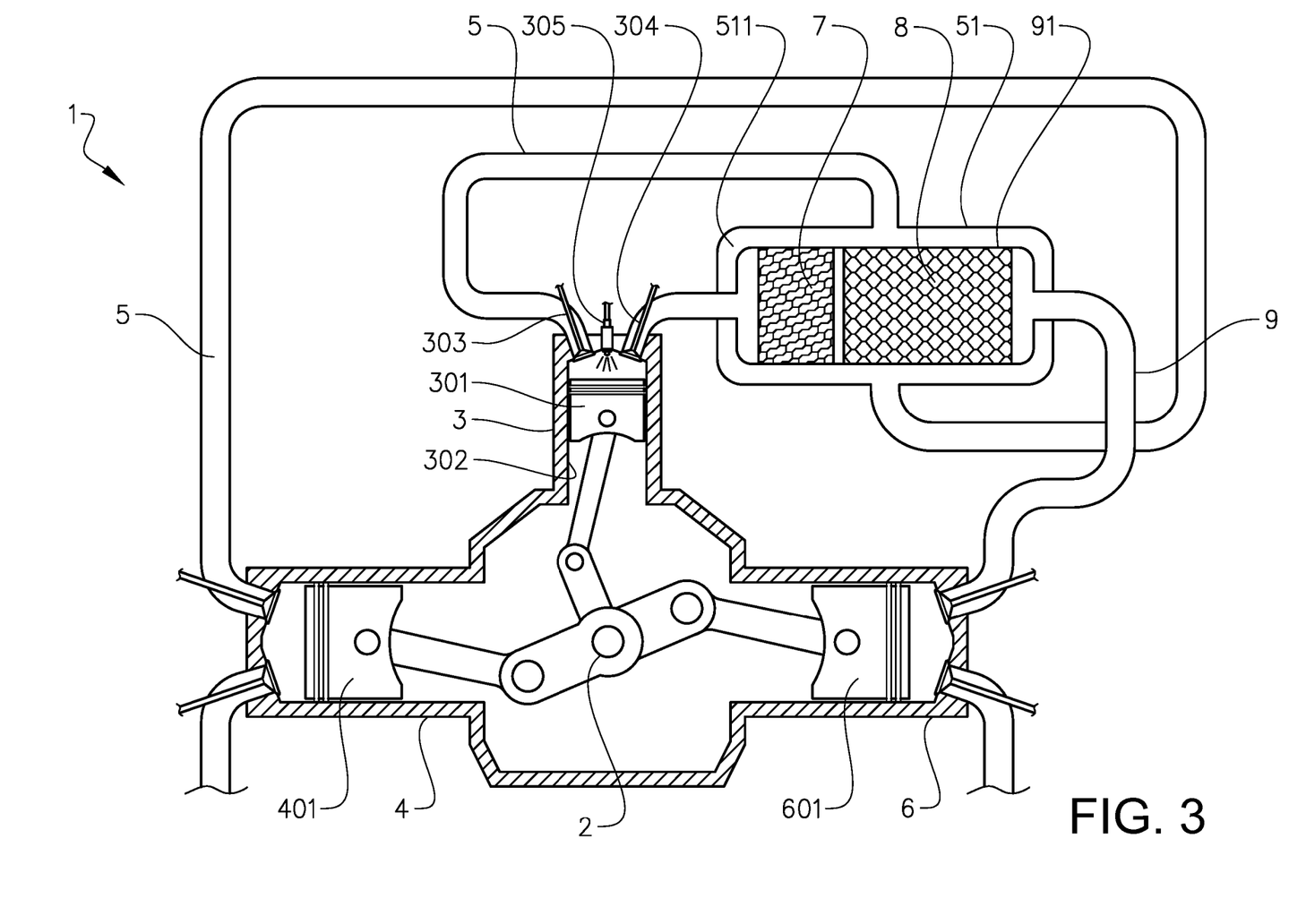
FIG. 3 is a schematic cross-sectional view of the engine system in FIG. 2.

Reference is made to FIG. 3 in which only one of the combustors 3, only one of compressors 4, and only one of the expanders 6 are shown. The piston 301 of each combustor 3 is arranged to reciprocate in the respective cylinder 302, whereby the pistons are all arranged to drive a crankshaft 2 of the engine. For simplicity, the combustor 3, the compressor 4, and the expander 6 are shown as all being located in the same cross-sectional plane; in a real implementation of the embodiment, the combustor 3, the compressor 4, and the expander 6 are preferably offset in relation to each other along the crankshaft 2.

The combustors 3 are provided with respective sets of inlet and outlet valves 303, 304, arranged to be actuated in a manner which may be known per se, e.g. with cams mounted on camshafts, (not shown). The timing and the maximum movements of the valves 303, 304 may also be variable, as is also known per se.

In addition, the combustors 3 are provided with respective fuel injectors 305 for injecting a fuel into the cylinders 302.

In example, the combustors 3 are arranged to provide a Diesel cycle to extract work from the air and fuel provided. However, the invention is equally applicable to engines in which the combustors are arranged to provide an Otto cycle, wherein the engine system may be provided with means for air mass flow control, such as variable inlet and outlet valves of the compressors 4, for controlling the air supply to the combustors 3. Alternatively, or in addition, the means for air mass flow control may comprise one or more throttles, for controlling the air supply to the combustors 3. The engine system may be provided with spark plugs in the combustors.

The pistons 601 of the expanders 6 are arranged to drive the crankshaft 2 with the energy extracted from the exhaust gases from the combustors 3. Further, the pistons 401 of the compressors 4 are all arranged to be driven by the crankshaft 2.

The exhaust buffer container 91 is located within the air buffer container 51. Thereby, the exhaust guide 9 is arranged to penetrate an external wall of the air buffer container 51. Thus, the exhaust buffer container 91 forms an integrated portion 91 of the exhaust guide 9, whereby the exhaust guide 9 is partly integrated with the air guide 5. The integrated portion 91 is herein also referred to as an exhaust guiding portion 91. The air buffer container 51 is herein also referred to as a formn of air guiding portion 51. The exhaust guiding portion 91 and the air guiding portion 51, with the former located within the latter, is here also referred to as an exhaust guiding unit.

It should be noted that in some embodiments, where there are two or more air guides 5, and two or more exhaust guides 9, connected to respective groups of combustors 3, the integration may be provided between an air guide and an exhaust guide which are connected to the same group of combustors 3, or alternatively to separate groups of combustors 3.

Figure 4:
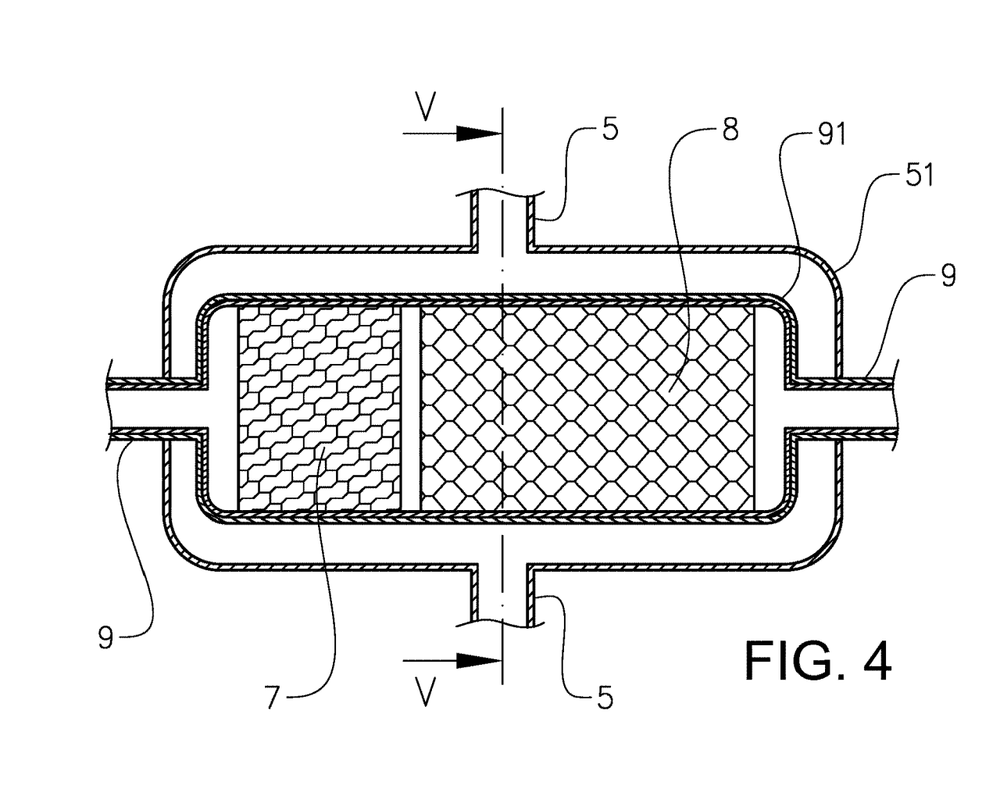
FIG. 4 shows a detail in FIG. 3.
Figure 5:
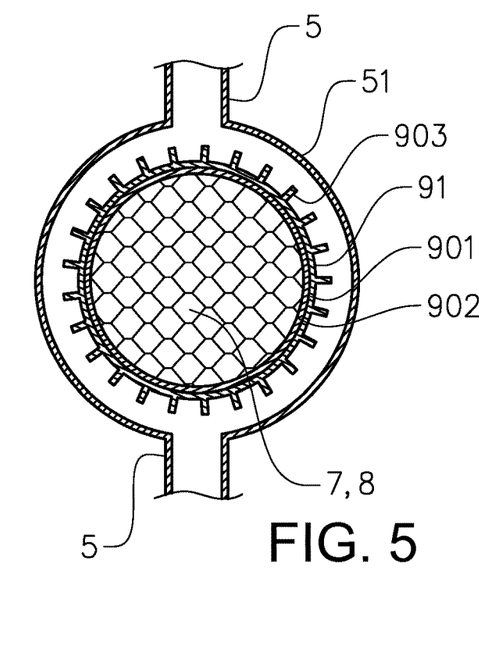
FIG. 5 shows a cross-section oriented as indicated with the arrows V-V in FIG. 4.

Reference is made also to FIG. 4 and FIG. 5. A pre-expander exhaust treatment device 7, 8 is located in the exhaust buffer container 91, and arranged to provide an exhaust treatment process to the exhaust gases from the combustors 3. The pre-expander exhaust treatment device 7, 8 comprises an oxidation catalyst 7, and a particulate filter 8 located downstream of the oxidation catalyst 7.

The exhaust buffer container 91 presents a circular cross-section. The exhaust buffer container 91 presents a wall 901, delimiting the exhaust buffer container 91, and an insulation layer 902 located inside the wall. The exhaust buffer container 91 further presents a plurality of externally protruding flanges 903.

Thus, in the multi-stage compression and expansion engine in this example, the compressors 4 are arranged to compress the air, the combustors are arranged to compress the air further, and to expand the gases in the combustors 3, and the expanders are arranged to expand the gases further. Further, the exhaust buffer container 91 and the air buffer container 51 may be adapted for an operation of the engine system 1, in which the exhaust guide 9 presents a pressure within the range of 10-25 bar and temperature within the range of 300-950° C., and the air guide 5 presents a pressure within the range of 8-12 bar and a temperature within the range of 250-350° C.

Since the exhaust buffer container 91 is located within the air buffer container 51, the pressure difference across the wall 901 of the exhaust buffer container 91 is considerably reduced, compared to a case where the exhaust buffer container 91 is in direct contact with the surrounding atmosphere. This reduces the structural load on the exhaust buffer container 91.

In addition, the movement of the compressed air past the exhaust buffer container 91 provides for an exchange of heat from the exhaust buffer container 91 to the air. This heat exchange is augmented by the flanges 903 on the exhaust buffer container 91. Also, the heat exchange is increased by the elevated absolute pressure in the air buffer container 51. This heat exchange provides for reusing the heat for power production, which is of particular interest at a low load operation of the engine. Also, the heat transfer reduces the temperature load on the material of the exhaust buffer container 91.

Figure 6:
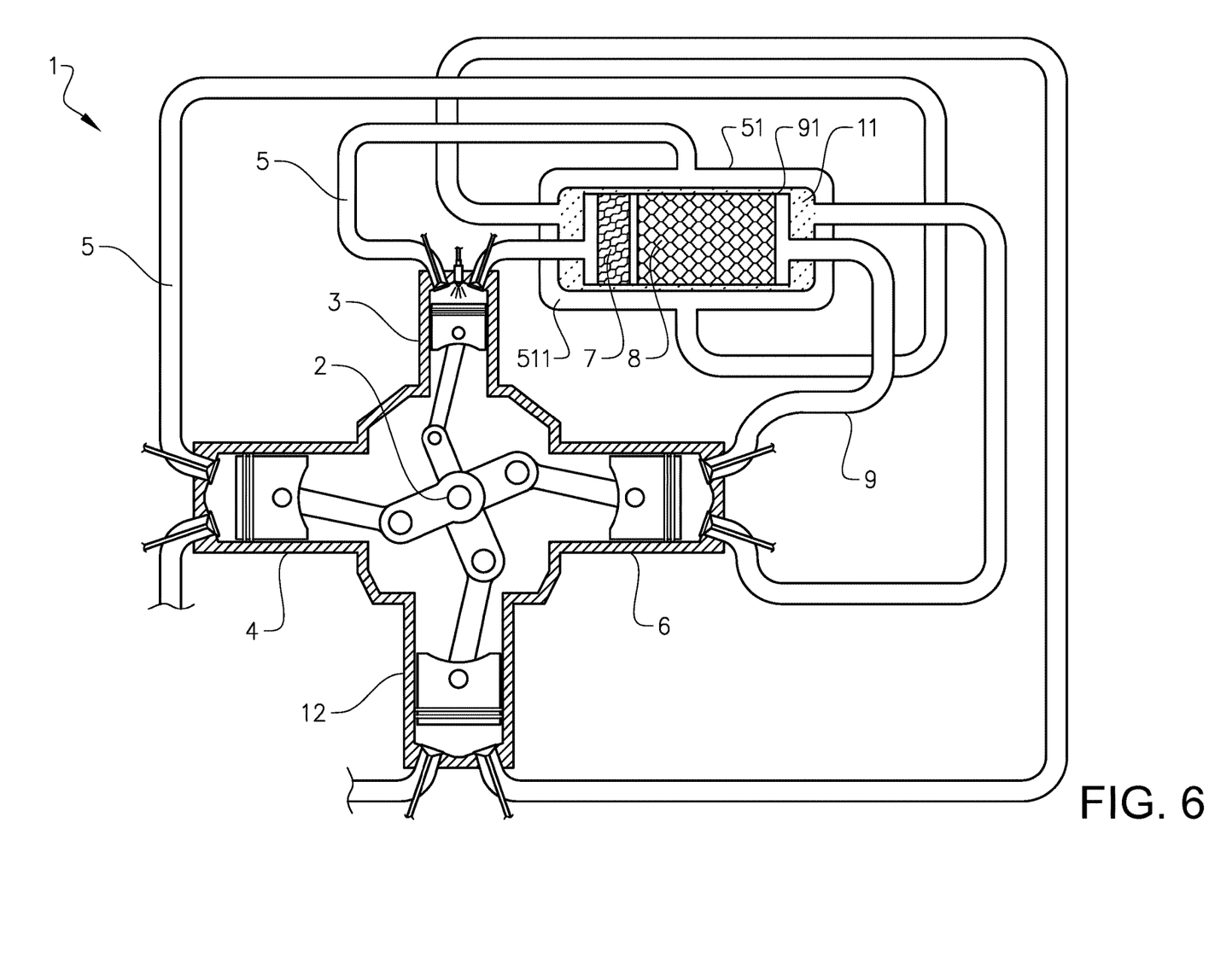
FIG. 6 is a schematic cross-sectional view of an engine system according to an alternative embodiment of the invention.

Reference is made to FIG. 6, showing an engine system according to an alternative embodiment of the invention. This embodiment shares features with the embodiment described with reference to FIG. 2-FIG. 5. However, some further advantageous features are also provided.

The system in FIG. 6 comprises an exhaust buffer container 91 with an exhaust treatment device 7, 8, similar to the one in the embodiment described with reference to FIG. 2-FIG. 5, which is here referred to as a pre-expander exhaust treatment device 7, 8. The system in FIG. 6 further comprises a post-expander exhaust treatment device 11 in the form of a selective catalytic reduction (SCR) catalyst. The SCR catalyst 11 is arranged to receive exhaust gases from the expanders 6 and to provide an exhaust treatment process to the received exhaust gases, which process reduces nitrogen oxides (NOx) as is known per se. The system also comprises an injector (not shown) for injecting, a reductant for the process in the SCR catalyst 11.

Figure 7:
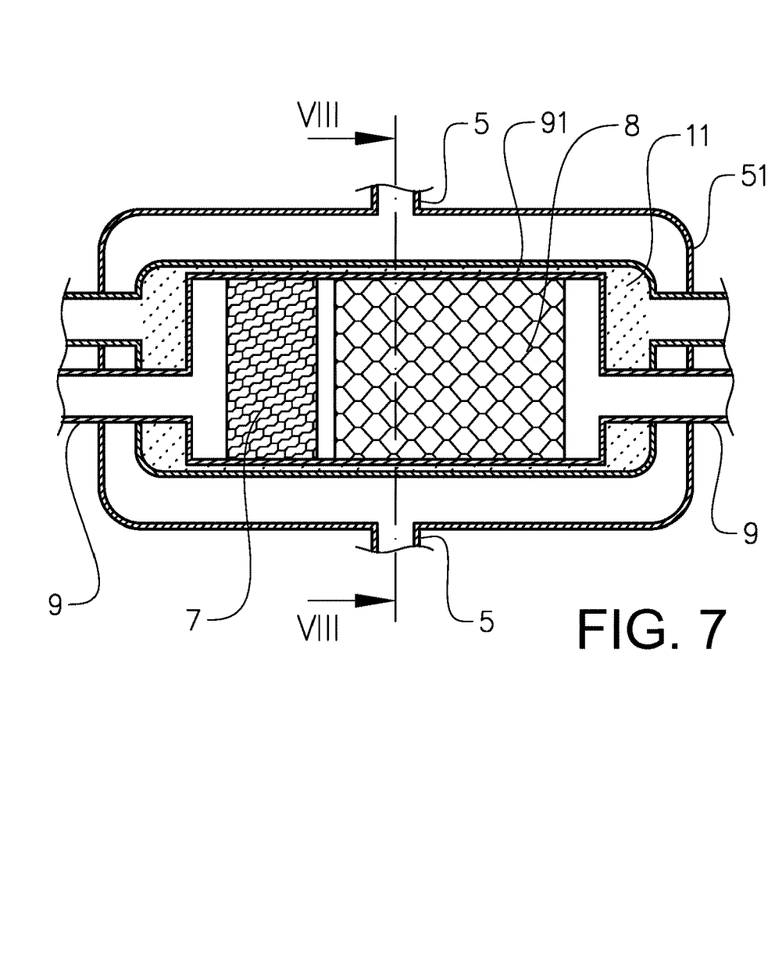
FIG. 7 shows a detail in FIG. 6.
Figure 8:
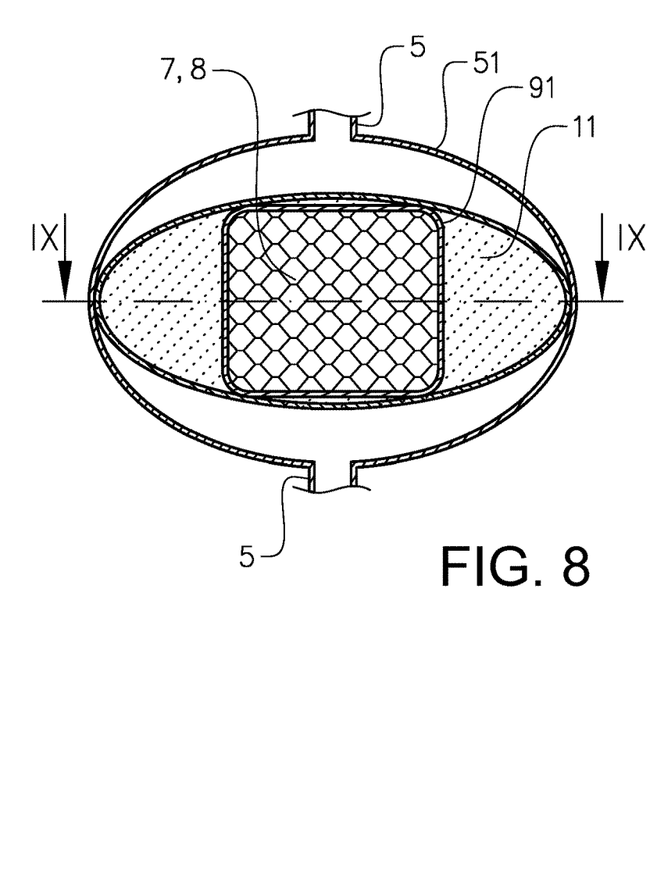
FIG. 8 shows a cross-section oriented as indicated with the arrows VIII-VIII in FIG. 7.
Figure 9:
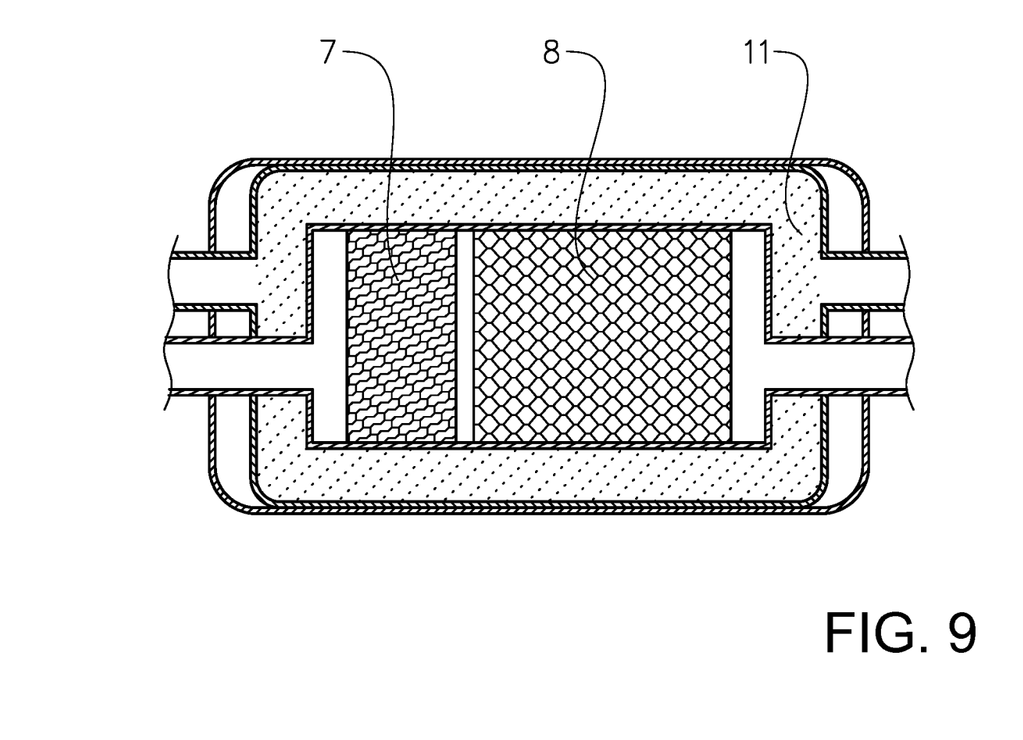
FIG. 9 shows a cross-section oriented as indicated with the arrows IX-IX in FIG. 8.

Reference is made also to FIG. 7-FIG. 9. In this advantageous embodiment, the post-expander exhaust treatment device 11, the air guide 5, and the exhaust guide 9 are integrated with each other. More specifically, the post-expander exhaust treatment device 11 is located externally of the exhaust buffer container 91 and internally of an external wall of the air buffer container 51. The post-expander exhaust treatment device 11 is located partly adjacent to the pre-expander exhaust treatment device 7, 8, separated by the wall of the exhaust buffer container 91, which in this example presents a rectangular cross-section with rounded corners. The integrated pre-expander exhaust treatment device 7, 8 and post-expander exhaust treatment device 11 is herein also referred to as an exhaust treatment unit.

The embodiment in FIG. 6-FIG. 9 comprises an expander 6 similarly to the embodiment in FIG. 2-FIG. 5, here referred to as a first expander 6. In addition, the system in FIG. 6 comprises a second expander 12 arranged to receive and expand exhaust gases from the post-expander exhaust treatment device 11 and to extract energy from the expanded exhaust gases.

The integrated pre-expander exhaust treatment device 7, 8 and post-expander exhaust treatment device 11 provides an advantageous heat transfer from the pre-expander exhaust treatment device 7, 8 to the post-expander exhaust treatment device 11. This is particularly advantageous, since the first expander 6 extracts energy, i.e. heat from the exhaust gases, and by the heat transfer from the pre-expander exhaust treatment device 7, 8, the temperature in the post-expander exhaust treatment device 11 may be kept high enough for the process therein. In addition, the second expander 12 may extract energy provided by the heat production of the process in the post-expander exhaust treatment device 11. The system is arranged so that during an operation thereof, the post-expander exhaust treatment device 11 presents a pressure within the range of 4-8 bar, and a temperature within the range of 250-400° C.

Figure 10:
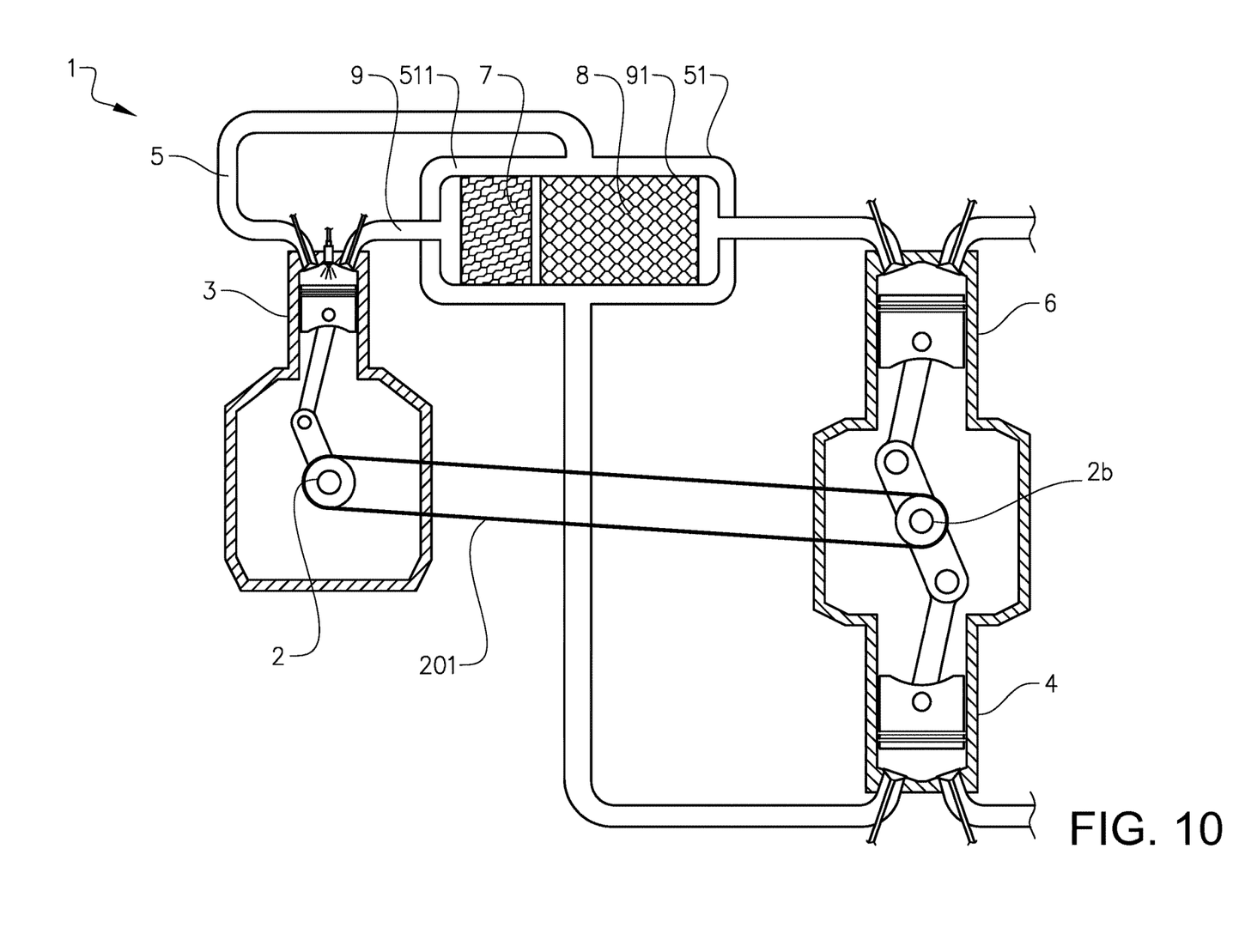
FIG. 10 is a schematic cross-sectional view of an engine system according to another alternative embodiment of the invention.

In alternative embodiments, the second expander 12 could be a turbine of a turbo charger with a compressor located upstream of the piston compressor 4. In such embodiments, the post-expander exhaust treatment device 11 may present a pressure within the range of 1.5-2.0 bar Reference is made to FIG. 10. It is understood that the invention is applicable also to engine systems, where pistons of the compressors 4 and the expanders 6 are indirectly connected to the crankshaft 2, e.g. via an additional crankshaft 2b and a chain or belt connection 201, as shown in FIG. 10. In FIG. 10, the pistons of the compressors 4 and the expanders 6 are directly connected to the additional crankshaft 2b, and the chain or belt connection 201 is provided between the crankshafts 2, 2b. Any suitable type of connection between the crankshafts 2, 2b may be provided. For example, as an, alternative to the chain or belt connection 201, a toothed gear wheel connection between the crankshafts 2, 2b may be provided.

It is to be understood that the present invention is not limited to the embodiments described a hove and illustrated in the drawings; rather, the skilled person will recognize that many changes and modifications may be made within the scope of the appended claims.

Figure 11:
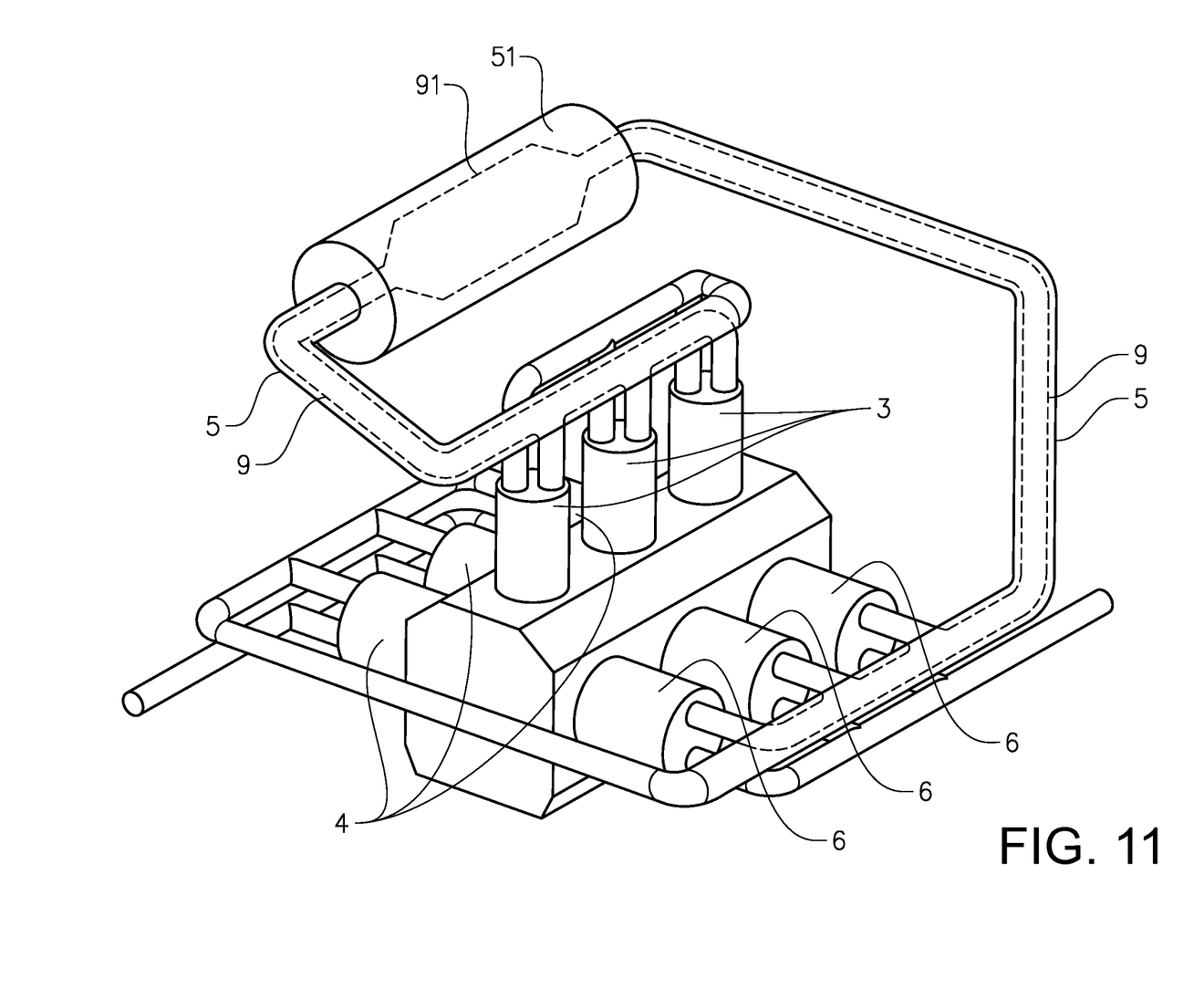
FIG. 11 is a schematic perspective view of an engine system according to yet another embodiment of the invention.

Reference is made to FIG. 11, showing an engine system according to yet another embodiment of the invention. This embodiment shares features with the embodiment described with reference to FIG. 2-FIG. 5. However, a further advantageous features is also provided.

In this embodiment, the exhaust guide 9 substantially fully integrated with the air guide 5. More specifically, in addition to the exhaust buffer container 91 being located within the air buffer container 51, other portions of the exhaust guide 9, upstream and downstream of the exhaust buffer container 91, are located within the air guide 5. Thereby the air guide encloses the exhaust guide 9 from a vicinity of the combustors 3 to a vicinity of the expanders 6. At the combustors 3 and the expanders 6, the exhaust guide 9 penetrates the external wall of the air guide 5. In other words, an integrated portion of the exhaust guide 91, enclosed by the air guide, extends from an exhaust guide location in a vicinity of the combustors 3 to an exhaust guide location in a vicinity of the expanders 6.

The embodiment FIG. 11 for most of, or substantially all of the exhaust guide 9 being isolated by the air guide 5. This reduces the temperature of the wall material of the exhaust guide 9, which makes it possible to use less temperature resistant, and therefore cheaper material for the exhaust guide. Also, the isolation of the exhaust guide 9 by the air guide 5 provides for reducing the heat radiation around the exhaust guide 9, without the need to provide isolation material around the exhaust guide 91. This is a substantial advantage in vehicles, where space requirements are strict. The possibility to omit isolation material for the exhaust guide 9 reduces the volume of the engine system, as well as the cost therefore,

The invention claimed is:

1. An internal combustion engine system comprising
at least one combustor,
a compressor arranged to compress air,
an air guide arranged to guide compressed air from the compressor to at least one of the at least one combustor,
an expander arranged to expand exhaust gases from at least one of the at least one combustor and to extract energy from the expanded exhaust gases, and
an exhaust guide arranged to guide exhaust gases from at least one of the at least one combustor to the expander, the exhaust guide being at least partly integrated with the air guide,
wherein the exhaust guide comprises an integrated portion which is located within the air guide, that the integrated portion presents a wall delimiting the integrated portion and that the integrated portion comprises an insulation layer located inside the wall.

2. A system according to claim 1, wherein the exhaust guide is arranged to penetrate an external wall of the air guide.

3. A system according to claim 1, wherein the integrated portion presents a circular cross section.

4. A system according to claim 1, wherein the intergrated portion presents a plurality of externally protruding flanges.

5. A system according to claim 1, wherein the air guide comprises an air buffer container arranged to provide an air buffer volume for the compressed air.

6. A system according to claim 5, wherein the system comprises a plurality of combustors, and that the air buffer container is arranged to deliver the compressed air to a plurality of the combustors.

7. A system according to claim 5, wherein the system comprises a plurality of compressors and that the air buffer container is arranged to receive compressed air from a plurality of the compressors.

8. A system according to claim 5, wherein the at least part of the exhaust guide is located within the air buffer container.

9. A system according to claim 1, wherein the exhaust guide comprises an exhaust buffer container.

10. A system according to claim 9, wherein the system comprises a plurality of combustors, and that the exhaust buffer container is arranged to receive exhaust gases from a plurality of the combustors.

11. A system according to claim 9, wherein the system comprises a plurality of expanders, and that the exhaust buffer container is arranged to deliver exhaust gases to a plurality of the expanders.

12. A system according to claim 9, wherein the exhaust buffer container is located within the air guide.

13. A system according to claim 5, wherein the exhaust guide comprises an exhaust buffer container, and the exhaust buffer container is located within the air buffer container.

14. A system according to claim 1, wherein a pre-expander exhaust treatment device is located in the exhaust guide, which pre-expander exhaust treatment device is arranged to provide an exhaust treatment process to the exhaust gases from the combustor.

15. A system according to claim 14, wherein the pre-expander exhaust treatment device is located in the integrated portion.

16. A system according to claim 14, wherein the pre-expander exhaust treatment device comprises an oxidation catalyst.

17. A system according to claim 14, wherein the pre-expander exhaust treatment device comprises a particulate filter.

18. A system according to claim 16, wherein the pre-expander exhaust treatment device comprises a particulate filter, and the particulate filter is located downstream of the oxidation catalyst.

19. A system according to claim 1, wherein the system comprises a post-expander exhaust treatment device arranged to receive exhaust gases from the expander and to provide an exhaust treatment process to the received exhaust gases.

20. A system according to claim 19, wherein the post-expander exhaust treatment device is a selective catalytic reduction (SCR) catalyst.

21. A system according to claim 19, wherein the post-expander exhaust treatment device and the air guide are integrated with each other.

22. A system according to claim 19, wherein the post-expander exhaust treatment device is located within the air wide.

23. A system according to claim 19, wherein the post-expander exhaust treatment device is located externally of the integrated portion and internally of an external wall of the air guide.

24. A system according to claim 23, wherein a pre-expander exhaust treatment device is located in the integrated portion which pre expander exhaust treatment device is arranged to provide an exhaust treatment process to the exhaust gases from the combustor.

25. A system according to claim 19, wherein the expander is a first expander and that the system comprises a second expander arranged to receive and expand exhaust gases.

26. A system according to claim 1, wherein the system comprises a crankshaft, and that the at least one combustor comprises a piston arranged to reciprocate in a cylinder, and to drive the crankshaft.

27. A system awarding to claim 1, wherein the compressor is a piston compressor.

28. A system according to claim 1, wherein the system comprises a crankshaft and that the compressor is arranged to be driven by the crankshaft.

29. A system according to claim 1, wherein the expander is a piston expander.

30. A system according to claim 1, wherein the system comprises a crankshaft, and that the expander is arranged to drive the crankshaft with the extracted energy.

31. A vehicle provided with an internal combustion engine system according to claim 1.

* * * * *